United States Patent [19]

Bauer

[11] 4,290,890
[45] Sep. 22, 1981

[54] SLUDGE DEWATERING PROCESS AND VEHICLE FOR USE IN SUCH PROCESS

[76] Inventor: William J. Bauer, 422 S. Park Rd., LaGrange, Ill. 60525

[21] Appl. No.: 11,122

[22] Filed: Feb. 12, 1979

[51] Int. Cl.³ .......................... C02C 3/00; B01D 1/00
[52] U.S. Cl. ................................... 210/608; 210/609; 210/776
[58] Field of Search .................. 34/93; 210/2, 10, 13, 210/14, 170, 65, 608, 609, 776; 405/52, 128; 71/12, 13

[56] References Cited

U.S. PATENT DOCUMENTS

| | | | |
|---|---|---|---|
| 1,430,182 | 9/1922 | Peck | 71/12 |
| 2,279,848 | 4/1942 | Unger, Jr. | 34/93 |
| 2,989,379 | 6/1961 | Gilberton | 71/12 |
| 3,619,422 | 11/1971 | Rummel et al. | 210/10 |
| 3,796,658 | 3/1974 | Meissner, Sr. | 210/65 |
| 3,847,808 | 11/1974 | Spohr | 210/66 |
| 3,859,799 | 1/1975 | Jaco, Jr. | 405/128 |
| 3,880,703 | 4/1975 | Hardman | 759/47 |
| 4,079,003 | 3/1978 | Manchak | 210/46 |

FOREIGN PATENT DOCUMENTS 1403186  8/1975  United Kingdom ................ 210/10

OTHER PUBLICATIONS

"New Method Reclaims Dredged Material, Fluid Tailings", Elements, vol. 3, No. 4, Jul./Aug. 1974 pp. 3–9.

*Primary Examiner*—Charles N. Hart
*Assistant Examiner*—David R. Sadowski
*Attorney, Agent, or Firm*—Neuman, Williams, Anderson & Olson

[57] ABSTRACT

A process for economical air drying of aqueous sludge, and a vehicle which may be used in practicing such process. The surface of a pool of sludge, such as in a sludge lagoon, is systematically agitated to break up the dry crust and to bring wet sludge to the surface for more rapid removal of water by evaporation and to form a dry upper layer of substantial thickness. The drier surface material is skimmed off the surface and either harvested directly or shifted laterally to provide an inclined surface on the lagoon so as to facilitate drainage of surface water, such as from precipitation. The dry surface sludge is harvested from the lagoon either after systematic shifting of the dry surface sludge to one side of the lagoon, or by transporting of the dry sludge through a conduit to the side of the lagoon, or by loading of the sludge into a receptacle of a stirring/harvesting vehicle for periodic delivery to the side of the lagoon. The vehicle which may be employed in practicing this process is provided with buoyant propelling wheels which penetrate the sludge but are sufficiently buoyant to support the rest of the vehicle above the surface of the lagoon, and mechanism for shifting or harvesting the sludge is mounted on the forward end of the vehicle. In supporting the vehicle and propelling it across the lagoon, the wheels effectuate agitation of the sludge in the lagoon.

10 Claims, 10 Drawing Figures

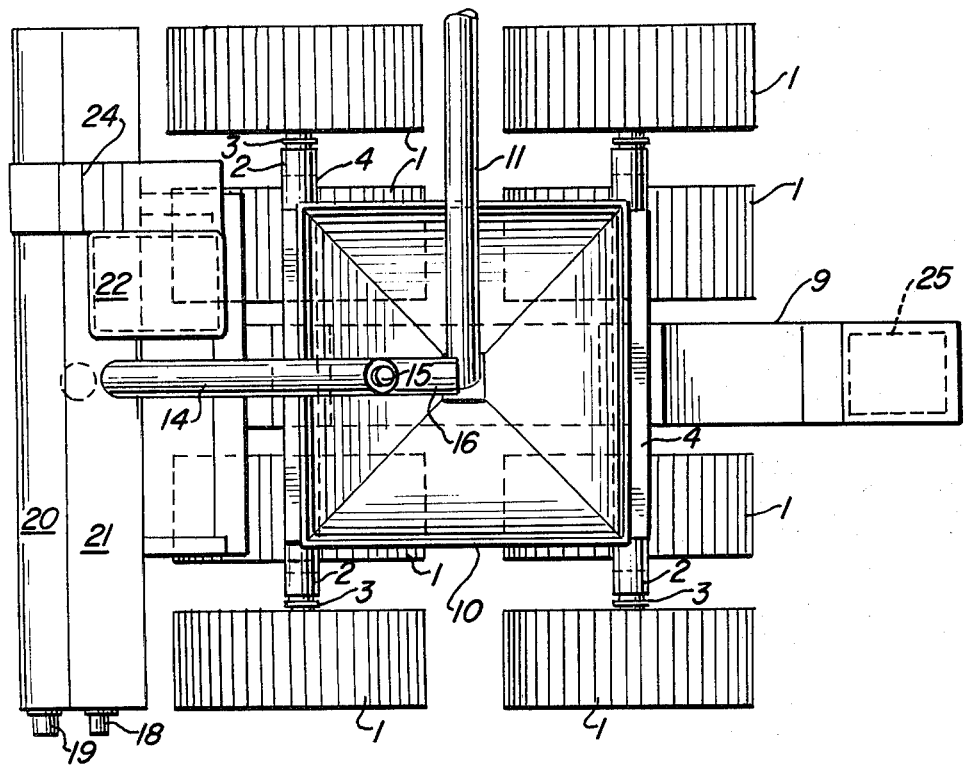
FIG. 4
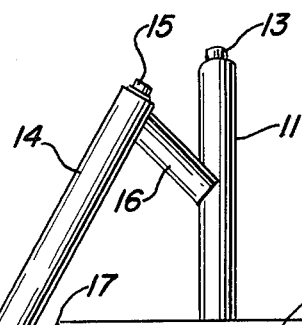
FIG. 3
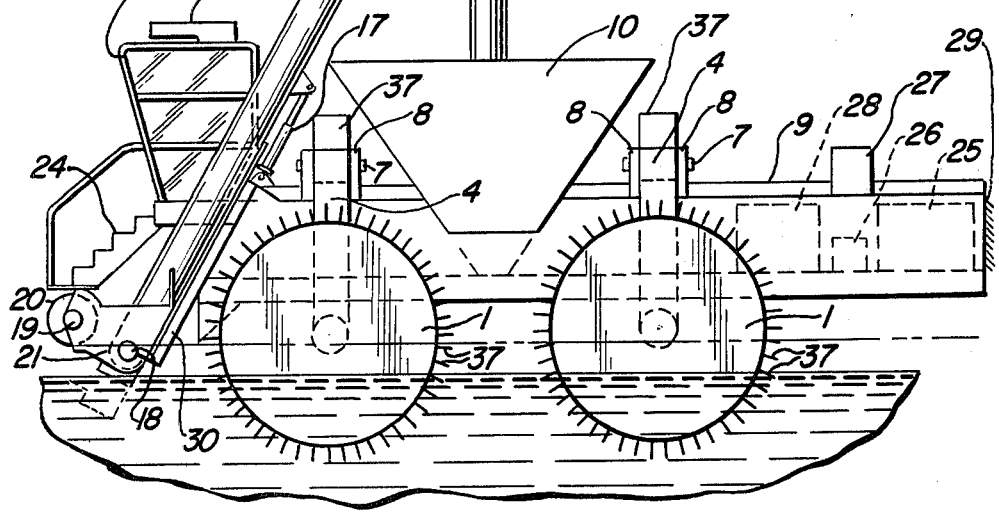

SLUDGE DEWATERING PROCESS AND VEHICLE FOR USE IN SUCH PROCESS

BACKGROUND OF THE INVENTION

This invention relates to the processing of waste material, and more particularly to improvements in processes for drying or dewatering sludges and a vehicle which may be used in practicing such processes.

Disposition of waste product sludges is a very large and growing problem. For example, the quantity of processed sewage sludge which results from biological treatment of human and industrial waste is presently estimated to be about five million dry tons per year in the United States, and it is estimated that there will be perhaps two or three times this amount when treatment plants presently under construction are in full operation. Added to this quantity are additional large quantities of the following types of sludges: tailings from mineral ore beneficiation; sludges from scrubbing of flue gases; dredgings from navigation channels; and sludges from a variety of industrial processes.

Most processed sewage sludges contain valuable nutrients and will, if applied as a fertilizer to soil, improve soil tilth and water-holding capacity and increase crop yields. However, processed sewage sludge is typically associated with large quantities of inherently attached water, rendering it practically unmanageable for use as a fertilizer. Hence most domestic sludge presently is disposed of by dumping it in rivers, lakes and oceans, or by burying it, or its ashes following incineration, in the earth.

Processes have been developed for separating out the water associated with processed sludge to thereby reduce the volume of the processed sludge and convert it into a salable fertilizer, e.g., heat drying, air drying on solid ground or on sand drying beds, centrifuges, filter presses, vacuum filters, and free drying in cold climates. These sludge drying or dewatering processes have been used with only varying degrees of success and at considerable expense.

Sludge lagoons also have been economically employed to accomplish a gradual thickening of sludge stored therein through the excess of evaporation over precipitation. Drying or dewatering of sludge in sludge lagoons has not been entirely successful, however, in that the evaporation rapidly dries out the surface layer of the sludge, forming a crust which protects the remainder of the sludge from further evaporation except at a much reduced rate.

Vehicles have been developed for moving across the surface of a sludge lagoon, to break up the crust formed on the surface of the sludge, and to agitate the sludge, thereby enhancing evaporation. The operation of these vehicles on sludge lagoons has not been entirely efficacious, however. Sludge typically is of a high viscosity. Prior art vehicle designs have encountered problems because of contact between the sludge and nonrotating parts of the vehicles, resulting in exertion by the sludge upon the vehicle of large shearing forces, hindering movement of the vehicles. Alternately, prior art vehicle designs have resulted in collection of sludge thrown by the rotating parts upon the vehicles, thereby adding to the weight of the vehicles and further hindering their movement. Finally, eventually the thickness of the crust formed is such that either such vehicles cannot be used, i.e., they are unsuitable for operation upon a "solid" surface, or the effective depth of agitation of such vehicles will not penetrate beyond the thickness of the crust. Further processing of the sludge thence requires harvesting of the crust from the surface of the lagoon, with different machinery, which is either impossible or impractical, and in any event, adds to the cost of the overall operation.

Accordingly, it is an object of the present invention to provide an improved process for dewatering and thickening of processed sludge.

More specifically, it is an object of this invention to provide a process for dewatering processed sludge in a sludge lagoon whereby moisture may be continually removed from the sludge in the lagoon by continually exposing wet sludge within the lagoon to the natural evaporative capacity of the atmosphere.

It is another object of this invention to provide a process whereby dry sludge which forms in a layer upon the surface of a lagoon may be continually removed so that it does not become impenetrable and so that wet sludge therebeneath is easily exposed to continue the drying process.

It is another object of this invention to provide a process for dewatering processed sludge in a sludge lagoon whereby the deleterious effect of precipitation on the drying of the sludge is substantially reduced.

Another object of this invention is to provide an improved vehicle for use in dewatering processed sludge.

Further, it is an object of this invention to provide a vehicle which can be operated on material of varying moisture content.

It is a further object of this invention to provide an improved vehicle for economical agitation of sludge in sludge lagoons and for harvesting of dried sludge, without requiring separate equipment for the different operations.

Moreover, it is an object of this invention to provide a vehicle for use in dewatering processed sludge which is adapted for movement on a sludge lagoon containing sludge of any moisture content and which may be employed to systematically shift and harvest controllable amounts of dry sludge on the surface of the lagoon and to agitate the remaining sludge.

It is a more specific object to provide a vehicle which is adapted for movement on a sludge lagoon containing sludge of any moisture content and which may be employed to agitate, shift and harvest sludge in the lagoon without the deleterious problems of prior art vehicles.

Other objects, advantages and capabilities of the present invention will become apparent as the description thereof proceeds.

A process is provided for accelerated drying or dewatering of sludge, along with a vehicle which may be used in practicing such process. Sludge of a relatively high moisture content is introduced into a sludge lagoon. A crust of relatively dry sludge is rapidly formed on the surface of the sludge by the natural evaporative capacity of the atmosphere. The sludge is agitated to break up and depress the crust of relatively dry sludge and to bring wet sludge from beneath the crust to the surface and thereby to expose the wet sludge to the natural evaporative capacity of the atmosphere, to thereby develop additional thickness of relatively dry sludge. The relatively dry sludge can also be systematically shifted laterally in such a manner as to tilt the surface of the lagoon and facilitate drainage of precipitation which collects on the surface of the sludge. A controlled amount of the relatively dry surface sludge is harvested by removal from the lagoon, for use as fertilizer or other beneficial use, while continuing the agitation of the remaining material to continue the development of a substantial thickness of relatively dry sludge.

A vehicle for carrying out the agitation and harvesting is supported in sludge of varying moisture contents by buoyant drive wheels which assure a depth of penetration of the surface such that only its wheels are in contact with the sludge. The wheels of the vehicle are both floats and traction units and are designed to agitate the sludge as the vehicle passes over it. Equipment is mounted on the front end of the vehicle for skimming off a controllable depth of undisturbed relatively dry surface sludge ahead of the agitating wheels and conveying this drier material to a point whence it is either discharged to one side or the other of the vehicle, transported to the side of the lagoon, or loaded onto the vehicle.

For a more complete understanding of this invention, reference should now be had to the embodiments illustrated in the accompanying drawings and described below by way of examples of the invention.

In these drawings:

FIG. 3 is a side elevation view of the vehicle of FIG. 2;

FIG. 4 is a top plan view of the vehicle of FIG. 2;

Figure 1:
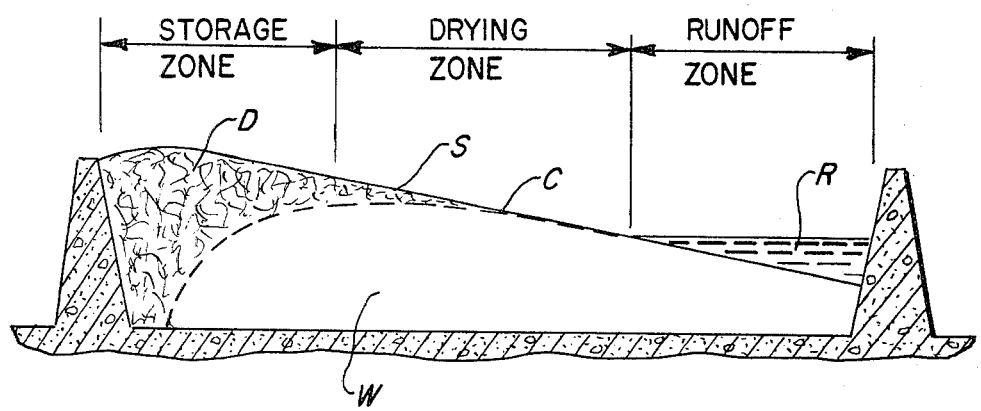
FIG. 1 is a schematic cross sectional view of a sludge lagoon being treated by a dewatering process employing principles of the present invention.

Referring now to the drawings, a sludge lagoon being treated with a dewatering process pursuant to principles of this invention is shown in FIG. 1. The sludge is introduced into the lagoon and a crust C allowed to form due to the excess of evaporation over precipitation. The crust may be thickened by pumping wet material from the lower portion of the lagoon onto the surface. As a crust is formed, the sludge is agitated to break up and depress the initial crust and bring further wet sludge to the surface for atmospheric drying. The drier surface material also is shifted laterally to accummulate or stockpile the drier material D toward one side of the lagoon (the left side in FIG. 1), causing the underlying wet material W to flow toward the opposite side for exposure, and forming an inclined or tilted surface S of the lagoon. This causes run-off of precipitation R to one end of the sludge lagoon, as at the right side in FIG. 1. Eventually, a substantial thickness of dry sludge is developed at the surface, particularly on the higher side.

With viscous sludges, an inclined surface also may be formed by periodically pumping lower wet materials from one portion of the lagoon onto the surface crust of a remote area in relatively small amounts, and permitting the additions to dry between pumpings, to successively build up the remote area relative to the area of removal.

Utilizing one embodiment of the process of this invention, the top layer of dry sludge is shifted and harvested by systematically skimming a controlled amount thereof off the surface of the lagoon and discharging the dry sludge to one side of the vehicle such that the dry sludge is systematically shifted to one side of the lagoon. In this manner, the lagoon is developed into three zones: a storage zone where dry sludge is stockpiled; a drying zone where systematic development of further layers of dry sludge occurs; and a run-off zone where precipitation collects, as illustrated schematically in FIG. 1. The weight of the stockpiled dry sludge in the storage zone forces underlying wetter sludge toward the drying zone. Dry sludge may be continuously reclaimed from the stockpile in the storage zone at the first end of the lagoon with conventional earth-handling equipment, and additional wet sludge may be continuously introduced into the lagoon in the run-off zone at the distal end of the lagoon.

In an alternate embodiment of the process of this invention, the layer of dry sludge may be harvested by systematically skimming it off the surface and transporting it directly to the side of the lagoon. Transporting of the dry sludge to the side of the lagoon is accomplished either concomitantly with the skimming operation, i.e., through a conveyer extending from the point of skimming to the side of the lagoon, or by collecting the dry sludge in a receptacle at the point of skimming and subsequently, periodically, transporting the receptacle to the side of the lagoon for unloading.

The agitation, shifting and harvesting steps of the process according to this invention may be carried out with a vehicle such as that depicted in FIGS. 2-9. The vehicle sinks into the sludge to such an extent that its weight is supported by the buoyancy of the wheels but no other portion of the vehicle other than the wheels and harvesting mechanism is in contact with the sludge. The wheels have paddle-like protrusions which displace material when the wheels are rotated so as to produce propulsion forces. As the wheels are rotated, the sludge crust is broken up and pushed down into wetter materials beneath the crust by the wheels so as to continually expose new wet materials and cause them to move to the surface for exposure to the atmosphere for drying. The broken crust portions are lighter than the wet sludge and tend to return to the surface coated by the wet sludge, which enhances the exposure, drying and thick-crust-forming process.

During the initial phases of the drying operation, shifting and harvesting equipment is omitted from the vehicle or not used. The vehicle is run at relatively high speed across the surface of the sludge lagoon so as to agitate as much surface as possible during the time of operation. The width of swath disturbed per pass by the vehicle may be on the order of twenty feet and the velocity on the order of ten feet per second, so that the typical area disturbed would be two hundred square feet per second or 720,000 square feet per hour. Allowing for turning around, the overall coverage would be about 500,000 square feet or approximately twelve acres per hour. During a good drying day of twenty hours actual operation, a total of 240 acres could be agitated. This would be twenty agitations of an area of twelve acres, for example.

The tilting of the surface of the lagoon for purposes of draining off the precipitation is relatively easy with dry "thick" sludge, but practically impossible with wetter "thin" sludge. Thus, the initial drying operations must be accomplished without the benefit of such drainage. This means that both precipitation and the sludge water would have to be evaporated. Once the sludge reaches an average solids content of approximately 12% or higher, the harvesting equipment described below may be attached to the vehicle so that harvesting of the undisturbed material ahead of the agitating wheels may be accomplished, and a tilted surface be effected by consistent shifting of sludge toward the higher or "dry" end of the lagoon. Such shifting may be by discharging the material to the side of the machine toward the "higher" end of the lagoon on each pass, for example by a lateral discharge conveyor or a blower-type catapulting mechanism. Also, the harvested material in the vehicle may be transported by the vehicle to the desired end and there discharged. An alternative would be to augment the movement of the sludge to the "higher" end by unloading through a separate conveying system, e.g., a pump and pipeline system for sludges up to about 20% solids, and a belt conveyor for thicker sludges, which would transport the material to the one end for "stacking" there, thus achieving the desired tilted surface more rapidly.

Once a substantial thickness of dry sludge is developed on the surface of the lagoon, e.g., approximately 12 to 18 inches thick, the harvesting operation is initiated. For example, approximately 6 to 12 inches of material may be safely harvested once the layer of dry sludge is formed without danger of the harvesting equipment gathering the underlying wetter materials. The harvesting equipment should be attached to the front end of the vehicle. The speed of operation during harvesting should be lower, e.g., on the order of one or two feet per second, or about 10% as fast as during agitation. This would permit harvesting operation on approximately 20 acres of surface during a day.

Figure 2:
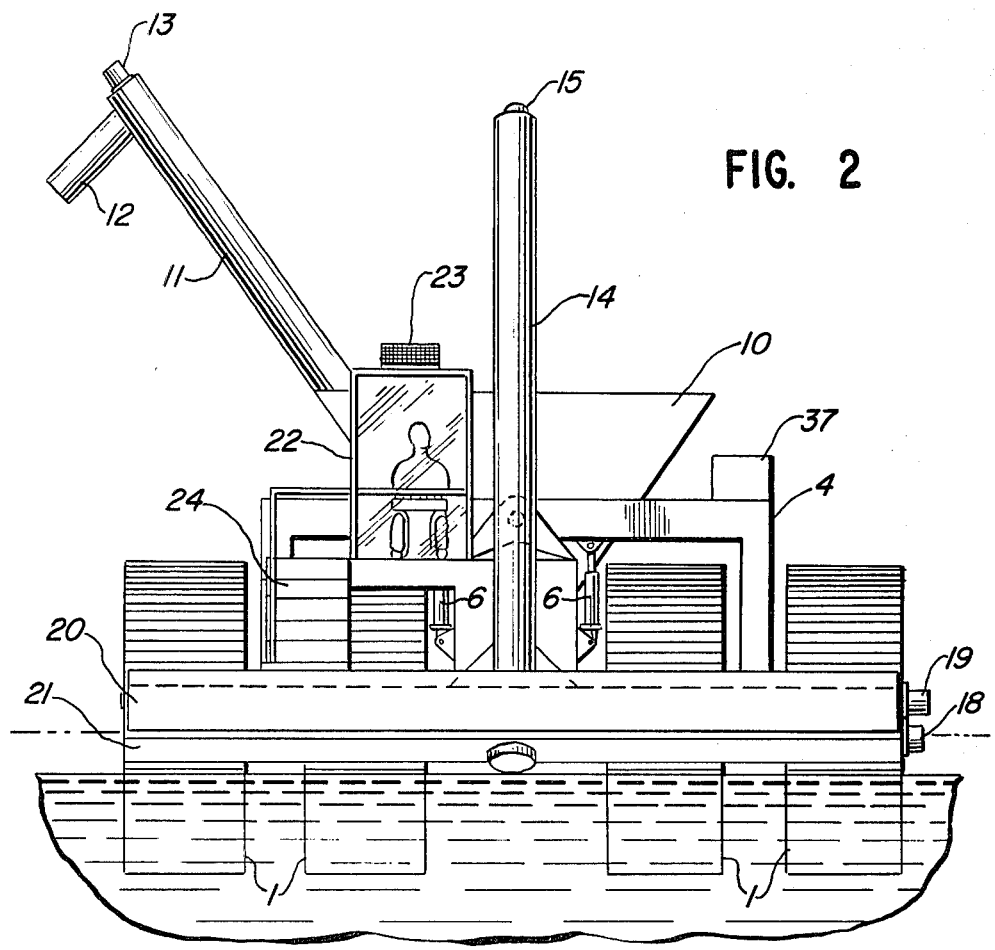
FIG. 2 is a front schematic view of a novel vehicle employing the principles of the present invention and which may be used in the aforementioned dewatering process and in harvesting dried sludge.

Referring to FIGS. 2-4 for a specific example, harvesting of the dried sludge would usually be accomplished by cutting a thin layer off the top, moving it by horizontal auger 20 to the center of the machine elevating it by inclined auger 14, and placing it in receptacle 10. Once the receptacle is filled, the vehicle may be steered to a point along the side of the lagoon where the receptacle 10 is emptied. One method of emptying would be to use inclined auger 11. Another method (not shown) would utilize a shore-mounted emptying device which would simply pick up receptacle 10 and dump it into a stockpile or into the hopper of a materials handling system.

In an alternative method of harvesting, the vehicle may be equipped with a powerful blower system such as that described hereinafter with respect to FIGS. 7-10 which will blow the harvested material through a lightweight conduit or pipe which floats on the previously-harvested surface of the lagoon. The conduit is flexible and long enough to follow the vehicle over substantial distances as the vehicle traverses the lagoon to conduct the harvesting operations. The conduit terminates in a facility located on the shore of the lagoon which separates the harvested material from the airstream and feeds it into a stockpile.

The vehicle shown in FIGS. 2-6 is specifically adapted to be used to harvest sludge by collecting it and periodically delivering it to the side of the lagoon. The scope of this invention is not intended to be limited to this particular embodiment of the vehicle, however, but rather to include various alternative vehicle forms as heretofor described and their equivalents.

The vehicle shown in FIGS. 2-6 includes a longitudinally extending chassis 9, a pair of inverted U-shaped axle frames 4 mounted on the chassis in longitudinally-spaced relation to one another to be on either side of the center of gravity of the vehicle, and eight buoyant wheels 1 connected by flanged connections 3 (FIG. 6) to axles 4a supported on the axle frame ends. Wheel drive units 2, e.g., hydraulic motors, drive the axles and wheels, and may be interposed between the axle frames 4 and the axles. A pair of wheels 1 are symmetrically mounted on each axle frame end to be driven by a single drive unit, see FIGS. 2 and 6.

The axle frames 4 are each pin-connected to the chassis 9 for relative lateral pivotal movement. Each pin connection includes a pair of support arms or brackets 8 integral with the chassis and a pin 7 inserted in axially-aligned openings through each bracket and the axle frame positioned between the brackets. The pin connection assemblies permit oscillation of the axle frames with respect to the chassis, that is to say, they allow relative rotative motion between the axle frames and the chassis about the longitudinal center line axis passing through the pins 7. One or more hydraulic cylinders 6 are connected between the chassis 9 and the forward frame 4 for controlling relative rotation of the chassis with respect to the forward axle frame. The rear frame may pivot freely subject to restraining action of springs and/or shock absorbers.

Figure 5:
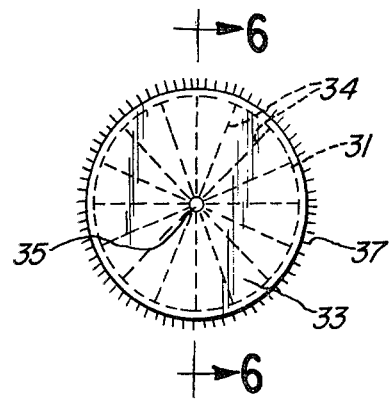
FIG. 5 is a side elevation view of one buoyant wheel of the vehicle of FIG. 2.
Figure 6:
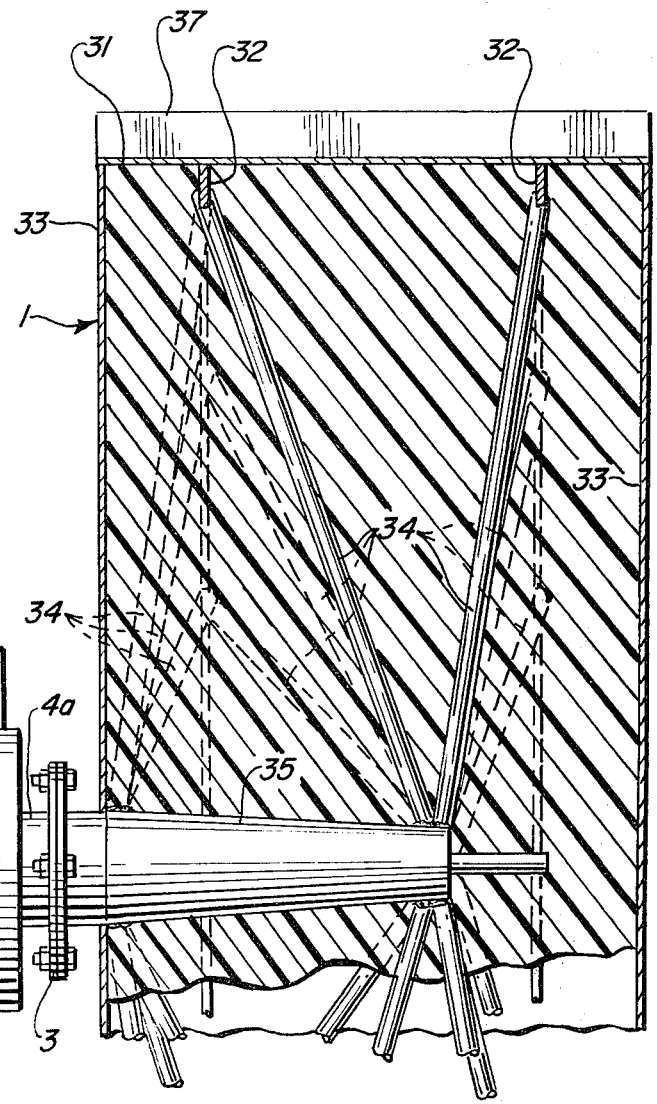
FIG. 6 is a partial sectional view, on a magnified scale, of a wheel of the vehicle of FIG. 2, along the line 6—6 of FIG. 5, and showing the relationship of the wheel to adjacent parts of the vehicle.

As seen in FIGS. 5 and 6, each buoyant wheel 1 consists of a rim 31, formed from abrasion resistant steel, preferably of about ¼ inch thickness, steel annular stiffener rings 32, steel side plates 33, preferably of about ⅛ inch thickness, and tubular steel spokes 34 which carry the wheel load both in tension and compression, delivering this load to an axle 35. The axle 35 is designed as a rotating cantilever beam, cantilevering off the respective flanged connection 3. The wheels are sealed, as rotatable pontoons, to provide flotation, and are filled with a light-weight foam filler 36, such as urethane, to provide protection against flooding of the inside of the wheel in the event of puncture. Steel cleats, paddle blades or similar devices 37 are provided about the circumference of the rim 31 to provide propulsion forces when the wheel is rotated. The devices 37 serve this propulsion or traction function in all types of mediums, including relatively thin liquid sludges, viscous sludges, and on relatively dry surfaces.

An operator's cab 22 is mounted on one side at the front end of the vehicle, ahead of the wheels 1 to thereby avoid collection of sludge thrown by the wheels 1 upon the cab 22. Stairs 24 are provided for easy access to the cab and the cab is air conditioned by a unit 23 mounted on top of the cab.

The equipment for shifting and harvesting dry surface sludge is mounted on the front of the chassis 9 ahead of the agitating wheels 1. This equipment includes a cutter or flail head 20 for cutting or chopping the material to be harvested, such as weeds, wood pieces, roots, sludge and related material near the surface of a sludge lagoon, a horizontal collection conveyor 21 for moving the harvested material to the center of the vehicle, a loading conveyor 14 and discharge chute 16 to convey the cuttings up and into a hopper 10 on the vehicle within which the material can be accumulated and stored temporarily. An unloading conveyor 11 and discharge chute 12 are provided for emptying the harvested material from the hopper onto shore facilities designed to receive the material. Each of the conveyors 11 and 14 consists of a tube having an auger therein. Conveyor 21 is an open trough with an auger having opposite helixes on each end, both feeding to the center conveyor 14. Drive units 13, 15 and 18, such as hydraulic motors, are provided for each of the conveyors 11, 14 and 21, respectively, and a similar drive unit 19 is provided for the cutter head 20.

A discharge conveyor of greater horizontal extent than conveyor 11, or a thrower or blower may be substituted for the unloading conveyor when it is desired to simply shift or windrow the material being collected by the machine, see e.g., the modified machine of (FIGS. 7-10). Such a discharge element may be movable to direct the material to either side of the vehicle for unidirectional shifting of the material on successive passes of the vehicle in opposite directions. Alternatively, such a discharge unit may be provided on each side for selective use on succesive passes.

The cutter head 20, collecting conveyor 21 and loading conveyor 14 with chute 16 are all mounted on a rail support system 30 on the chassis 9. A hydraulic cylinder 17 is provided for controlling vertical positioning of these members on the rail support system of the chassis, thereby enabling control of the vertical positioning of these members relative to the axle frames and wheels and thus control of the depth of penetration of the shifting and harvesting operations. The previously-described hydraulic cylinder 6, enabling control of relative rotation of the chassis 9 to the front axle frame 4, thus enables control of the inclination of the shifting and harvesting members which are mounted on the chassis, with respect to the surface of the lagoon to maintain the harvesting head generally parallel to the surface layer being harvested.

Control of the hydraulic cylinders 6 may be either manual by the cab operator as he visually determines, or automatic, e.g., the operator adjusting a spirit level or mercury U-tube device, provided with electrical contacts to operate a solenoid switching arrangement. The solenoid switches may turn hydraulic pumps on and off, or operate hydraulic valves to move the cylinders up and down, thus tilting the frame 4 with respect to the chassis 9 in such a manner as to maintain the chassis cutter head roughly level or roughly parallel to some plane to which the level device would be set by the operator. The hydraulic cylinders 6 also function as dampening devices to prevent oscillations. Leveling also may be by use of known laser beam techniques.

Control of the hydraulic cylinder 17 would be either manual or automatic, i.e., the operator setting a limiting pressure or limiting range of pressures to be maintained in the hydraulic cylinder 17. A larger pressure would force the members down further into the sludge, as it would increase the amount of sludge displaced by the cutter head 20 and the collecting conveyor 21. A lesser pressure would allow the buoyant force to raise the cutter head 20 and the collecting conveyor 21.

The vehicle further includes an engine 25, a hydraulic pump 26, and a fuel tank 28 mounted within the chassis 9 and attendant air intakes and exhausts 27 and 29. To insure proper balance of the vehicle, a counterweight 37 is provided on the end of the axle frame 4 on the side of the vehicle opposite that on which the cab and unloading conveyor and chute are mounted. In the interest of concise description, and since these mechanisms, as well as previously-mentioned drive units, sludge conveyors, hopper and cutter head, are well known in the art and may be employed without departing from the nature and scope of the invention, they are not described in greater detail herein.

The use and operation of the vehicle of FIGS. 2-6 is as follows: The vehicle is initially run on the lagoon at high speeds, with the cutter head 20 and collecting conveyor 21 raised to an inactive position clear of the sludge, to break the surface crust and agitate the sludge merely by the action of the wheels 1. To this end, the number and width of the wheels result in effective agitation of the entire swath spanned by the machine. Once a crust of dry sludge of sufficient dryness and thickness is formed on the surface of the lagoon, the vehicle is operated on the lagoon with the cutter head and collecting conveyor lowered into the sludge, preferably with a lateral discharge unit in operation to begin shifting the sludge to tilt the surface of the lagoon and facilitate run-off of precipitation, while thereby continuing to agitate the sludge.

When a substantial thickness of dry sludge is formed on the surface of the lagoon and it is desired to harvest the drier surface material, the vehicle is operated on the lagoon with the cutter head and collecting conveyor lowered into the drier surface sludge and with the loading conveyor 14 operative to load the harvested sludge from the collecting conveyor into the hopper 10 and without simultaneous operation of the discharge unit. The harvesting operation is begun with the hopper empty and the cutter head lowered to the desired position where it may be set for automatic control, if desired. The filling of the hopper may be indicated by a predetermined position in the upward movement of the cutter head under the influence of the hydraulic cylinder 17 as the vehicle rides progressively lower in the sludge due to the added weight. Once this limit has been reached, an alarm warns the operator that the hopper is full and harvesting should cease. The cutter head and collecting conveyor are stopped, the cutter head and collecting conveyor are raised to their inactive positions clear of the sludge, and the vehicle is reversed in direction, turned around and driven to the side of the lagoon where the hopper is unloaded by the unloading conveyor 11. Alternatively, hopper 10 would be picked up and dumped by shore facilities.

The operability of vehicles constructed in accordance with the principles of the present invention on sludge lagoons is attributable to, among other characteristics, their ability to operate with only their wheels in contact with the sludge. This is due, in part, to the wheel construction which provides for a large buoyance. An example of the wheel dimensions and depths of wheel submersion envisioned by the present invention and the resultant buoyance calculations are as follows:

Wheel dimensions: 10.5' dia. × 4' wide

Empty vehicle:

Contemplated depth of wheel submersion: 3.3'
Volume of displacement per wheel: 248 cu. ft.
Displacement in pounds per wheel:
   62.5 (lbs./cu. ft.) × 248 cu. Ft. = 15,500 lbs.
Displacement of 8 similar wheels:

8×15,500 lbs.=124,000 lbs.

Permissible Weight of Full Vehicle:

Contemplated maximum depth of wheel submersion to maintain chassis clearance from the sludge: 4.5'
Volume of displacement per wheel: 294 cu. ft.
Displacement in pounds per wheel:
62.5 (lbs./cu. ft.)×294 cu. ft.=18,375 lbs.
Displacement of 8 similar wheels:
8×18,375 lbs.=147,000 lbs.

Thus, it is seen that a vehicle constructed with eight wheels of the exemplary dimensioning could itself weigh 124,000 lbs. and could carry a live load of 23,000 lbs. Of course, if the weight of the vehicle itself was minimized, that would allow for maximization of the live load, i.e., the vehicle could continue to harvest for a larger percentage of its operating time and use a lesser percentage of its operating time for returning to the side of the lagoon to unload, in that mode of operation. For example, assuming that the empty weight for the vehicle shown in FIGS. 2-6 is 110,600 lbs, such a vehicle, with a limitation upon its depth of penetration or submergence to 4.5 feet, could handle live loads of up to 36,400 lbs.

The wheeled propulsion system permits operation in and on sludge or other mediums of all consistencies, including highly liquid sludge where floatation and propulsion are the primary problems, viscous sticky sludges where adherence of the material to any part of the vehicle in contact with the reservoir of material generates serious operational problems, and essentially solid surfaces which support the weight of the vehicle. These results are obtained from several related features. The planes of rotation of the wheels are parallel to the direction of propulsion. Propulsion is obtained from the rotation of the wheels in the direction of derived motion in all mediums. The buoyancy of the propulsion wheels assures that only these rotating propulsion components, except for the selective use of the skimming equipment, will be in contact with the sludge in the reservoir. The vehicle frame and other components remain clear of the sludge. Thereby viscous drag and accumulation of the sludge in front of the vehicle or against or between vehicle components are avoided.

Figure 7:
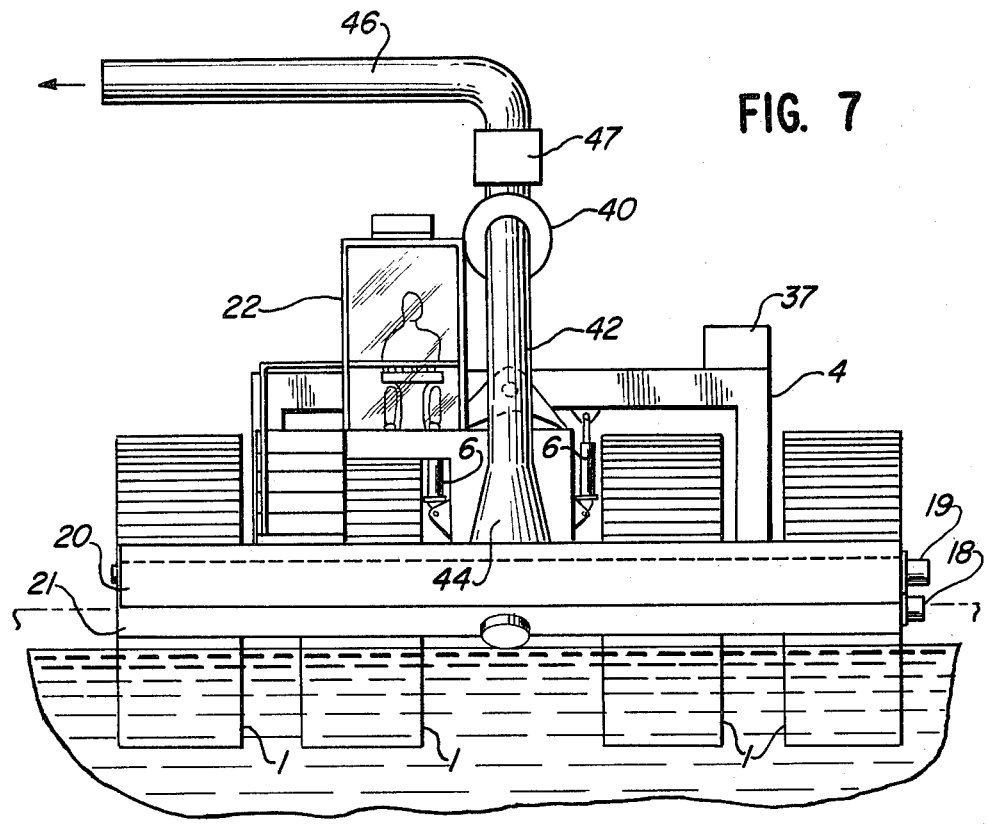
FIG. 7 is a front schematic view of a modified form of the vehicle in FIG. 2.
Figure 10:
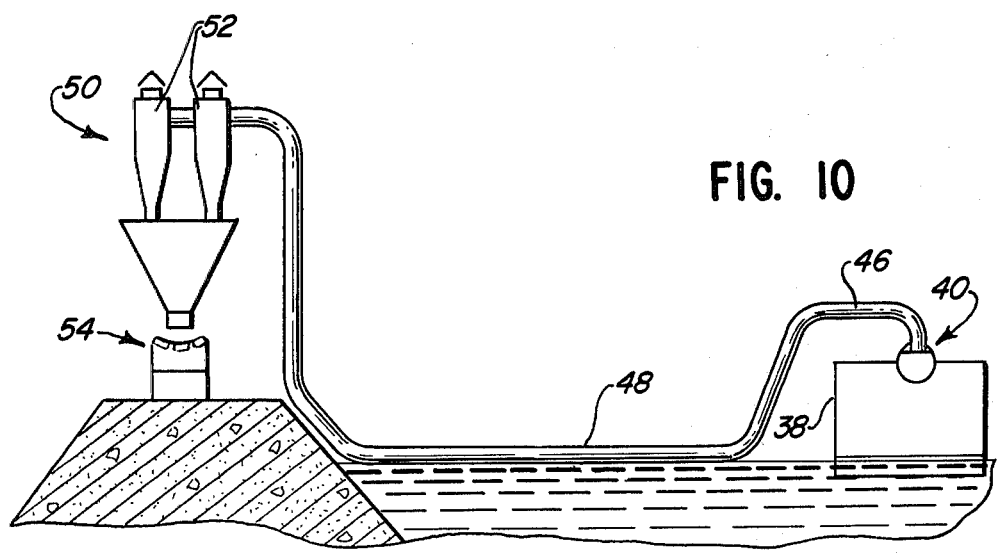
FIG. 10 is a schematic side view of an alternative mode for handling the drying sludge as it is harvested with the vehicle of FIG. 7.
Figure 9:
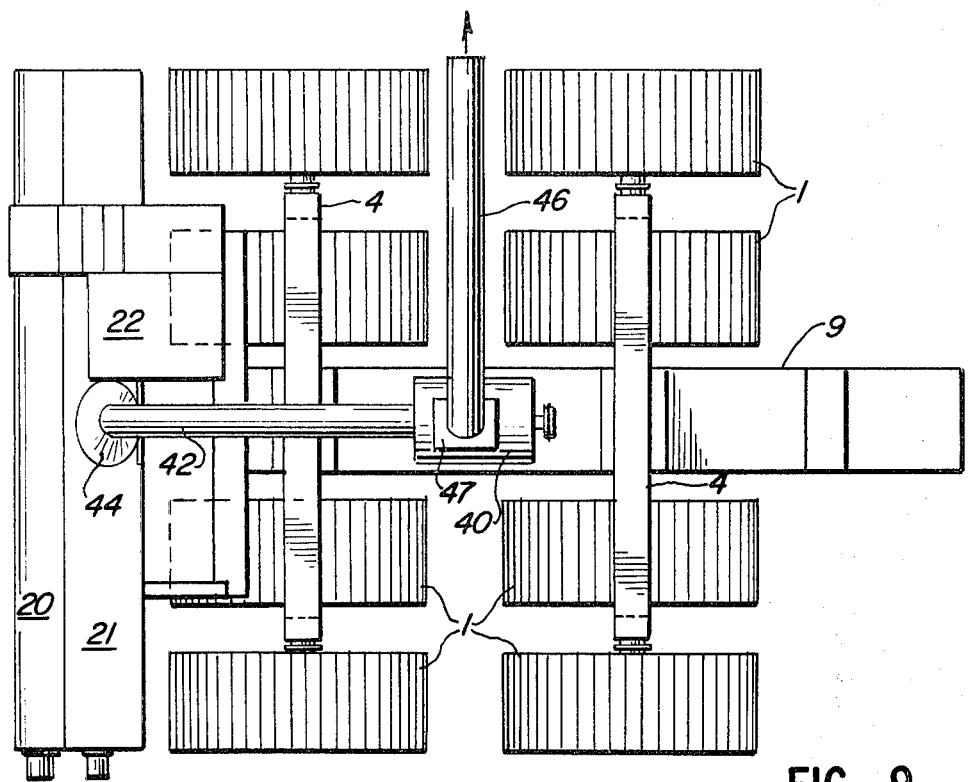
FIG. 9 is a top plan view of the vehicle of FIG. 7.
Figure 8:
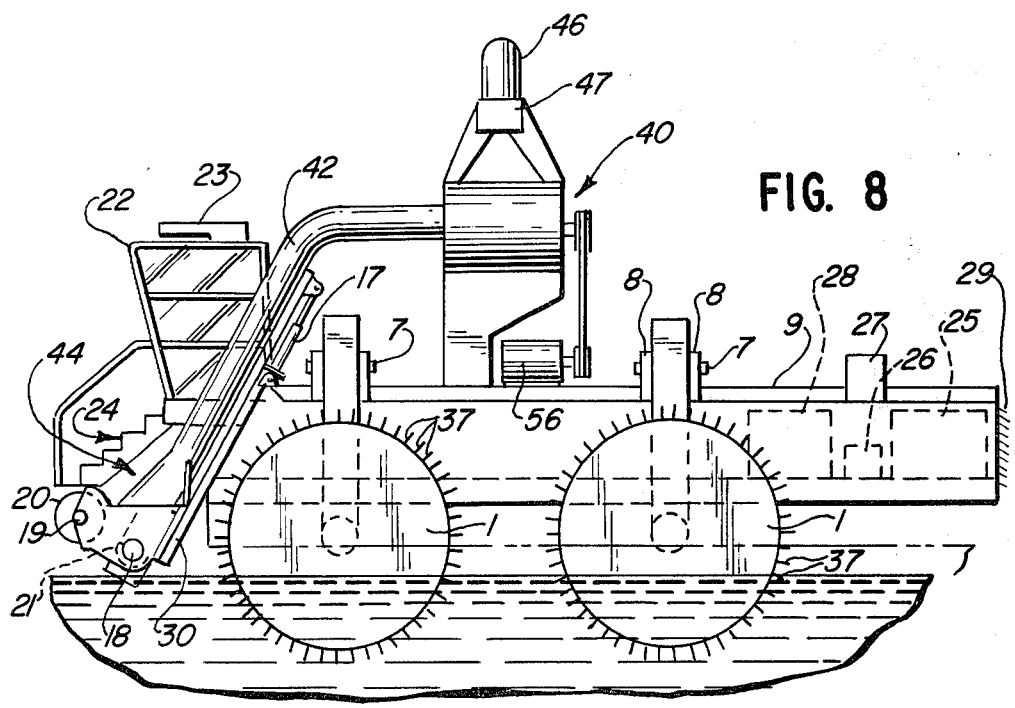
FIG. 8 is a side elevation view of the vehicle of FIG. 7.

The vehicle 38 illustrated in FIGS. 7-10 is the same as the vehicle of FIGS. 2-6, with modified material handling equipment thereon for shifting or transporting the dried sludge. Referring to FIGS. 7-9, a pneumatic blower 40 is mounted on the chassis 9. Such a blower may include a flinger wheel having peripheral paddles for both flinging the material and for entraining it in air for conveyance. An inlet duct 42 guides the harvested material from a suction head 44 at the harvesting head to the inlet of the blower 40. A lateral discharge conduit 46 extends horizontally to one side of the vehicle, and may be mounted by a swivel joint 47 to permit convenient switching of the discharge from one side to the other for continuous discharge in one direction on successive traverses of a lagoon in opposite directions. Thus the harvested sludge may be shifted successively in one direction on each traverse by lateral blowing from the conduit 46 for accumulating the drier sludge on one side o the lagoon to create the desired surface slope for drainage of precipitation, or for similar successive movement to one shore for subsequent pick-up by other techniques. Alternatively, a lightweight flexible conveying conduit 48 may be connected to the discharge 46 and to processing equipment 50 on the shore, as illustrated in FIG. 10. For example, the latter equipment may include cyclone separators 52 to separate the solids from the conveyance air, and a conveyor 54 to carry the separate sludge solids to a stockpile or to a loading point. The conduit 48 floats on the lagoon and is flexible and long enough to follow the vehicle over substantial distances as the vehicle traverses the lagoon. A hydraulic motor 56 is provided to drive the blower 40 for propelling the sludge through conduits 44 and 46 for lateral discharge, and through conduit 48 when used.

It will be appreciated that improved processes and vehicles have been disclosed which meet the aforestated objects.

While particular embodiments of this invention are described above and shown in the drawings, it will be understood, of course, that the invention is not to be limited thereto, since many modifications may be made by those skilled in the art, particularly in light of the teachings herein. It is contemplated, therefore, by the appended claims, to cover any such modifications as fall within the true spirit and scope of this invention.

What is claimed is:

1. A process of obtaining dried or dewatered sludge from a sludge lagoon including:
    reducing the moisture content of the sludge near the surface of the lagoon by exposing such sludge to the atmosphere for drying;
    periodically agitating at least the surface portion of said sludge, including breaking and submerging the surface crust which forms during such drying, thereby exposing further wet sludge to the atmosphere, wherein said agitation is performed by operating upon the lagoon a buoyant vehicle which is supported on said lagoon by its buoyancy, propelling the vehicle across the surface of the lagoon and thereby agitating the sludge by breaking up the relatively dry sludge crust near the surface of the lagoon, until a thickened crust layer of relatively dry sludge of substantial thickness is formed at the surface of the lagoon over a body of wet sludge; and
    removing the upper portion of said thickened crust layer of said relatively dry sludge from said lagoon while leaving such body of wet sludge in said lagoon.

2. The process of claim 1 further including agitating the surface portion of the sludge remaining in said lagoon while so removing the upper portion of said thickened crust layer.

3. A process of drying or dewatering sludge in a sludge lagoon including:
    reducing the moisture content of the sludge at the surface of the lagoon by exposing such sludge to the atmosphere for drying;
    forming a layer of relatively dry sludge crust at the surface of the lagoon over a body of wet sludge;
    skimming such relatively dry sludge crust off of a portion of the surface of the lagoon while leaving in place such body of wet sludge therebeneath and agitating at least the surface portion of the sludge so remaining in place;
    shifting the relatively dry skimmed crust sludge in a manner to create a higher portion and an inclined upper surface on the lagoon and to cause drainage of precipitation from the surface of the lagoon;
    pumping wet sludge from beneath the relatively dry sludge crust at the surface of the lagoon and depositing it on top of the relatively dry crust layer for exposure to the atmosphere for drying in a manner enhancing creation of an inclined upper surface on the lagoon;

forming a substantial thickness of relatively dry crust sludge at the surface of at least the higher portion of the lagoon; and harvesting the relatively dry crust sludge from the upper portion of such area of said substantial thickness while leaving in place the sludge therebeneath.

4. A process of drying or dewatering sludge in a sludge lagoon including:

reducing the moisture content of the sludge at the surface of the lagoon by exposing such sludge to the atmosphere for drying;

forming a thick layer of relatively dry sludge crust at the surface of the lagoon over a body of wet sludge, wherein said forming of such thick layer includes operating upon the lagoon a buoyant vehicle which is supported on said lagoon by its buoyancy, propelling the vehicle across the surface of the lagoon and thereby agitating the sludge by breaking up the relatively dry sludge crust near the surface of the lagoon and pushing the broken sludge crust down into wetter sludge therebeneath, and thereby coating said broken relatively dry sludge crust which, because of its lighter weight, returns to the surface with wetter sludge thus exposing such wetter sludge to the atmosphere for drying, to form such thick layer of relatively dry sludge crust;

skimming at least the upper portion of said thick layer of relatively dry sludge crust off of a portion of the surface of the lagoon while leaving in place such body of wet sludge therebeneath and agitating at least the surface portion of the sludge so remaining in place;

shifting the relatively dry skimmed crust sludge in a manner to create a higher portion and an inclined upper surface on the lagoon and to cause drainage of precipitation from the surface of the lagoon;

forming a substantial thickness of relatively dry crust sludge at the surface of at least the higher portion of the lagoon; and harvesting the relatively dry crust sludge from the upper portion of such area of said substantial thickness while leaving in place the sludge therebeneath.

5. A process of drying or dewatering sludge in a sludge lagoon including:

reducing the moisture content of the sludge at the surface of the lagoon by exposing such sludge to the atomsphere for drying;

forming a layer of relatively dry sludge crust at the surface of the lagoon over a body of wet sludge;

skimming said relatively dry sludge crust off of a portion of the surface of the lagoon while leaving in place such body of wet sludge therebeneath and agitating at least the surface portion of the sludge so remaining in place;

shifting the relatively dry skimmed crust sludge in a manner to create a higher portion and an inclined upper surface on the lagoon and to cause drainage of precipitation from the surface of the lagoon;

wherein said skimming, agitating and shifting comprises operating upon the lagoon a buoyant vehicle which is supported on said lagoon by its buoyancy, propelling the vehicle across the surface of the lagoon and thereby agitating the sludge by breaking up the relatively dry sludge crust and exposing wetter sludge therebeneath, and skimming and shifting relatively dry crust sludge by skimming and shifting means on the vehicle prior to such agitation of the sludge by said vehicle;

forming a substantial thickness of relatively dry sludge crust at the surface of at least the higher portion of the lagoon; and harvesting the relatively dry sludge from the upper portion of such area of said substantial thickness while leaving in place the relatively wet sludge therebeneath.

6. A process as claimed in claim 1, 4, 5 or 2 wherein said buoyant vehicle has buoyant wheels which support said vehicle by their buoyancy and propel the vehicle on the surface of the lagoon and effect such agitation of the sludge.

7. The process of claim 6 in which said vehicle is supported by the buoyancy of said wheels such that the remainder of the vehicle is supported thereby out of contact with the sludge in said lagoon.

8. The process of claim 3, 4 or 5 further including pumping such precipitation from the lagoon.

9. The process of claim 3, 4 or 5 further including shifting the relatively dry skimmed crust sludge to one area of the lagoon and stockpiling such sludge at said one area of the lagoon in a manner to drive wet sludge therebeneath toward another area of the lagoon under the weight of such stockpiled sludge.

10. The process of claim 9 further including reclamation of dry sludge from said stockpile of relatively dry skimmed crust sludge.

* * * * *